United States Patent [19]
Yoshida et al.

[11] Patent Number: 6,068,406
[45] Date of Patent: May 30, 2000

[54] NEEDLE ROLLER BEARING

[75] Inventors: Masuhisa Yoshida, Iwata; Tomoaki Terada, Fukuroi, both of Japan

[73] Assignee: NTN Corporation, Osaka, Japan

[21] Appl. No.: 09/123,347

[22] Filed: Jul. 28, 1998

[30] Foreign Application Priority Data

Aug. 6, 1997 [JP] Japan .................................. 9-211967
Jul. 6, 1998 [JP] Japan ................................. 10-190547

[51] Int. Cl.[7] ..................................................... F16C 33/46
[52] U.S. Cl. ........................... 384/470; 384/572; 384/580
[58] Field of Search .................................... 384/580, 576, 384/575, 573, 572, 470

[56] References Cited

U.S. PATENT DOCUMENTS 4,613,239   9/1986   Hofmann et al. ......................... 384/580
5,255,985  10/1993   Alling .................................. 384/470 X
5,391,005   2/1995   Alling .................................. 384/580 X
5,584,583  12/1996   Hidano ..................................... 384/470
5,826,988  10/1998   Furukawa et al. ........................ 384/572

Primary Examiner—Thomas R. Hannon
Attorney, Agent, or Firm—Arent Fox Kintner Plotkin & Kahn, PLLC

[57] ABSTRACT

The needle roller bearing B in this embodiment comprises a cage 1 having a plurality of elongated window-shaped pockets 1a formed therein at predetermined circumferential intervals, and a plurality of needle rollers 2 rollably received and held in the pockets 1a. The four corners A of each pocket 1a of the cage 1 are provided with relief portions 1an4 each having a circumferentially recessed arcuate peripheral wall surface. The circumferential dimension between the circumferential top 1a41 of the relief potion 1a4 and the pocket wall surface 1a1 is set with respect to the diameter Dw of the needle rollers 2 such that $0.01 \leq h/Dw \leq 0.2$. The provision of the relief portions 1a4 at the corners A of each pocket 1a of the cage 1 permits the relief portions 1a4 to serve as passageways for the lubricating oil.

6 Claims, 6 Drawing Sheets

NEEDLE ROLLER BEARING

BACKGROUND OF THE INVENTION

The present invention relates to a needle roller bearing wherein a cage and a plurality of needle rollers are assembled. The needle roller bearing of the invention is suitable for use as a support bearing for a shaft (main shaft or counter shaft) or a gear (driven speed change gear) in a transmission used in automobiles, construction machines, agricultural machines and the like, a support bearing for a connecting rod in bicycle engines, or a support bearing for a planet gear in sun-and-planet gear devices.

In the transmission of an automobile or the like, the support section of the driven speed change gear has often employed therein a needle roller bearing with no bearing ring, wherein a cage and a plurality of needle rollers are assembled. This is for the purpose of reducing the size and weight of the transmission by making use of the advantages of this type of needle roller bearings that they are light in weight, small in sectional height and high in load capacity.

FIG. 8 shows a conventional needle roller bearing which supports the driven speed change gear of a transmission. This needle roller bearing comprises a cage 11 having a plurality of elongated window-shaped pockets 11a formed therein at predetermined circumferential intervals, and a plurality of needle rollers 12 received in the pockets 11a.

The cage 11 is an annular body having annular portions 11b on axially opposite sides of the pockets a, and a pillar portion 11c circumferentially continuous with said annular portions 11b on opposite sides. The axially middle portion 11c1 of the pillar portion 11c is dented so as to be smaller in diameter than the axially opposite portions 11c2, and the axially middle portion 11c1 and the axially opposite portions 11c2 are connected to each other through inclined portions 11c3. Further, the annular portions 11b are in the form of flanges projecting radially inward from the axially opposite portions 11c2 of the pillar portion 11c. As a result, the longitudinal section of the cage 11 including the pillar portion 11c is substantially M-shaped as a whole.

As shown enlarged in FIG. 8(b), the four corners A' of each pocket 11a of the cage 11 are each formed with a corner round 11a1 to relax stress concentration. The size (radius of curvature) of the corner round 11a1 is set at a smaller value than the chamfering size of a chamfer 12a on the end surface of the needle roller 12 so as to avoid interference with the needle roller 12.

A needle roller bearing incorporated in a transmission is lubricated with lubricating oil fed by the splash system or forced circulation system. If the lubricating oil has a large amount of foreign matter, such as abrasion powder from the material of gears, mixed therein, such foreign matter accumulates in the bearing, a fact which sometimes forms the main cause of lowering the bearing life. The reason is that the accumulation of foreign matter causes flaking which starts from indentations formed on the contact surface of the bearing by the foreign matter cutting thereinto or peeling due to the hindrance to the formation of lubricating oil films. Particularly, since the bearing which supports a driven speed change gear is operated under special load conditions (light load during idling with respect to the main shaft, and heavy load during rotating with the main shaft), the contact surface tends to be damaged owing to the accumulation of foreign matter or the hindrance to circulation of lubricating oil).

The problem of the bearing life being decreased owing to said accumulation of foreign matter or said hindrance to circulation of lubricating oil likewise occurs, for example, in a needle roller bearing supporting the connecting rod of an engine or a needle roller bearing incorporated in a sun-and-planet gear device. Particularly, a needle roller bearing supporting the large-diameter boss of a connecting rod is structurally subjected to large centrifugal force and inertial force, so that oil film exhaustion tends to occur in the slide surface of the cage and the like. Therefore, it is an important technical problem to enhance the discharge of accumulated foreign matter and the circulation of lubricating oil.

SUMMARY OF THE INVENTION

Accordingly, an object of the invention is, in this type of needle roller bearings, to enhance the discharge of accumulated foreign matter and the circulation of lubricating oil and to improve the bearing life.

To achieve said object, the invention provides a needle roller bearing comprising a cage having a plurality of elongated window-shaped pockets formed therein at predetermined circumferential intervals, and a plurality of needle rollers received in the pockets, said needle roller bearing being characterized in that the corners of the pockets of said cage are formed with circumferentially recessed relief portions serving as passageways for the lubricating oil. Circulation of lubricating oil permitted through said relief portions improves the discharge of accumulated foreign matter and the circulation of lubricating oil.

While the size of the relief portions is not particularly limited, it is preferable from the viewpoint of achieving said effects that the circumferential depth h relatively to the diameter Dw of the needle rollers be defined by $0.01 \leq h/Dw \leq 0.2$ preferably $0.05 < h/Dw \leq 0.2$.

The needle roller bearing of the invention is suitable for use as a support bearing for a rotary member in a transmission. The rotary member referred to herein is a main shaft, counter shaft, or driven speed change gear. The needle roller bearing of the invention produces a desirable effect particularly when used as a support bearing for a driven speed change gear.

Further, the needle roller bearing of the invention is also suitable for use as a support bearing for a connecting rod in an engine or a support bearing for a planet gear in a sun-and-planet gear device.

Embodiments of the invention will now be described with reference to the drawings.

DESCRIPTION OF THE PREFERRED EMBODIMENTS

Figure 1:
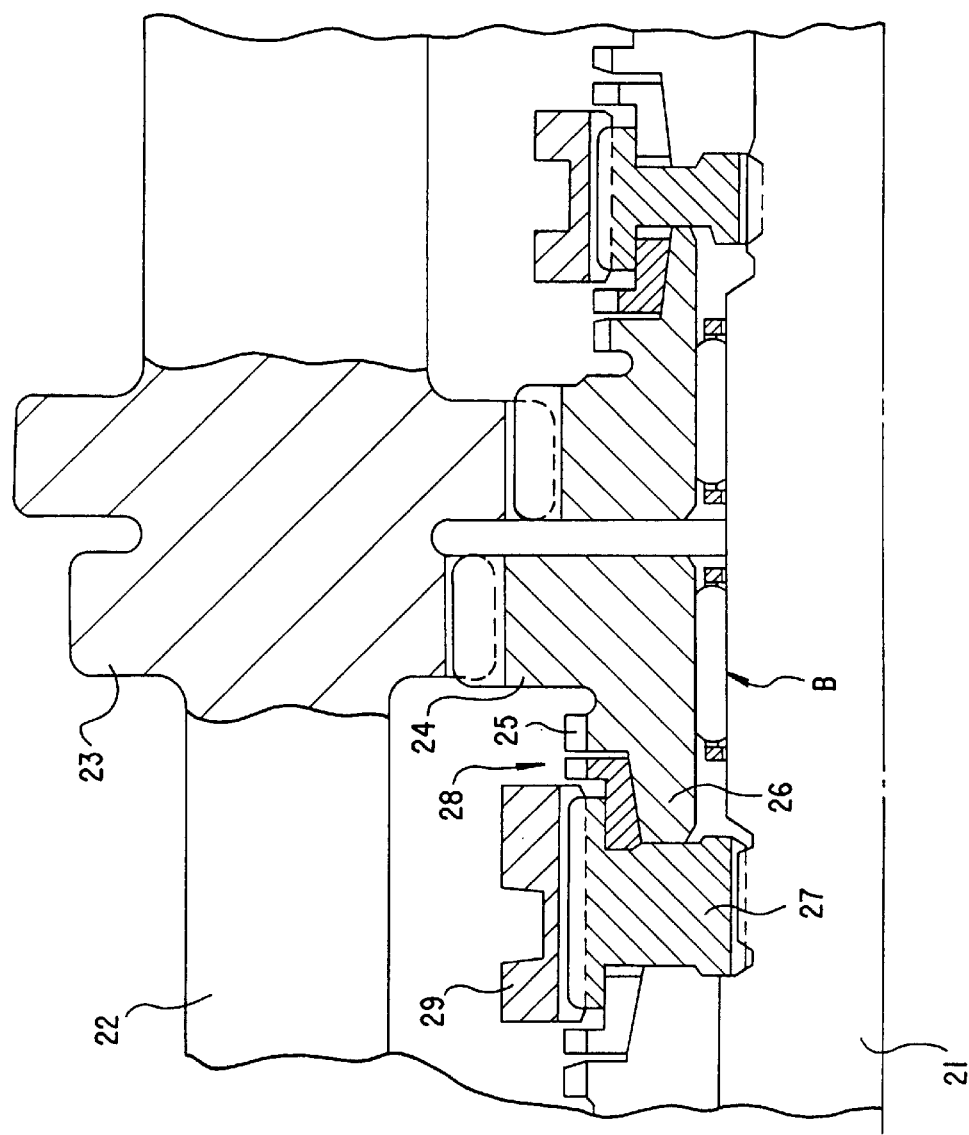
FIG. 1 is partial enlarged sectional view showing the region around the speed change gear of a transmission.

FIG. 1 shows by way of example the region around a speed change gear in the transmission (synchronous mesh type) of an automobile.

A main shaft 21 and a counter shaft 22 are disposed with a predetermined spacing therebetween and in parallel with each other and are supported for rotation by an unillustrated transmission case. The main shaft 21 is operatively connected to an output shaft (associated with the driving wheel) and the counter shaft 22 is operatively connected to an input shaft (associated with the engine).

The counter shaft 22 is integrally formed with a driving speed change gear 23, while a driven speed change gear 24 is mounted for rotation on the main shaft 21 through a needle roller bearing B. The driving and driven speed change gears 23 and 24 are in constant mesh. One side of the driven speed change gear 24 is formed with spline teeth 25 and a cone 26, and a hub 27 is disposed close to the end surface of the cone 18 and integrally connected to the main shaft 21. A synchronous mechanism 28 is interposed between the hub 27 and the cone 26, and a sleeve 29 is axially movably spline-connected on the outer periphery of the hub 27.

In the state shown in this figure, the driven speed change gear 24 receives the rotation from the driving speed change gear 23 and idles relative to the main shaft 21. On the other hand, when the sleeve 29 is axially moved from the state shown in the figure, it engages with the spline teeth 25 of the driven speed change gear 24 through the synchronous mechanism 28, thereby interconnecting the driven speed change gear 23 and the main shaft 21. Thereby, the rotation of the driving speed change gear 24 is reduced with a predetermined speed change ratio by the driven speed change gear 24 and transmitted to the main shaft 21.

The needle roller bearing B receives a light load when the driven speed change gear 24 idles relative to the main shaft 21 and a heavy load when the driven speed change gear 24 rotates integrally with the main shaft 21.

Figure 2:
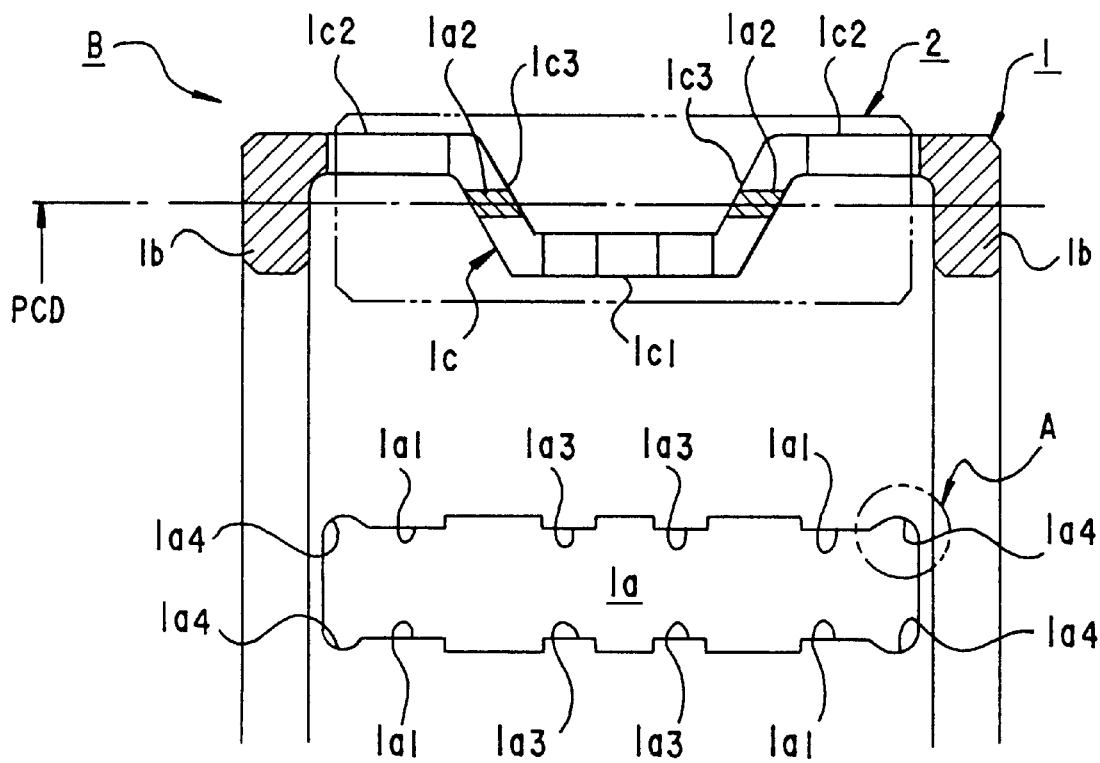
FIG. 2 is a sectional view showing an embodiment of a needle roller bearing according to the present invention.

FIG. 2 shows by way of example a needle roller bearing B according to an embodiment interposed between the inner peripheral surface of the driven speed change gear 24 and the outer peripheral surface of the main shaft 21 in a transmission like the one described above. The needle roller bearing B in this embodiment comprises a cage 1 having a plurality of elongated window-shaped pockets 1a formed therein at predetermined circumferential intervals, and a plurality of needle rollers 2 rollably received and held in the pockets 1a.

The cage 1 is an annular body (which, sometimes, is of two-part split construction) having annular portions 1b on axially opposite sides of the pockets 1a, and a pillar portion 1c circumferentially continuous with said annular portions 1b on opposite sides. The axially middle portion 1c1 of the pillar portion 1c is dented so as to be smaller in diameter than the axially opposite portions 1c2, and the axially middle portion 1c1 and the axially opposite portions 1c2 are connected to each other through inclined portions 1c3. Further, the annular portions 1b are in the form of flanges projecting radially inward from the axially opposite portions 1c2 of the pillar portion 1c. As a result, the longitudinal section of the cage 1 including the pillar portion 1c is substantially M-shaped as a whole.

The cage 1 of such shape can be produced, for example, by drawing and bottom-punching a steel sheet blank to form a cylindrical blank having a substantially M-shaped basic sectional shape and punching said cylindrical blank to form pockets 1a therein (steel sheet press-formed cage).

The axially opposite portions 1c2 of the pillar portion 1c are formed on their inner side (pocket side) with pocket wall surfaces (roller slip-off preventing stops) 1a1 for preventing the needle rollers 2 from slipping off radially outward.

Further, the inclined portions 1c3 of the pillar portion 1c are formed on their inner side with pocket wall surfaces 1a2 which contact with the rolling surfaces of the needle rollers 2 on the pitch circles (the pitch circles of the needle rollers 2) PCD, while the axially middle portion 1c1 of the pillar portion 1c are formed on its inner side with pocket wall surfaces (roller fall-off preventing stops) 1a3 for preventing the needle rollers 2 from falling off radially inward.

Figure 3:
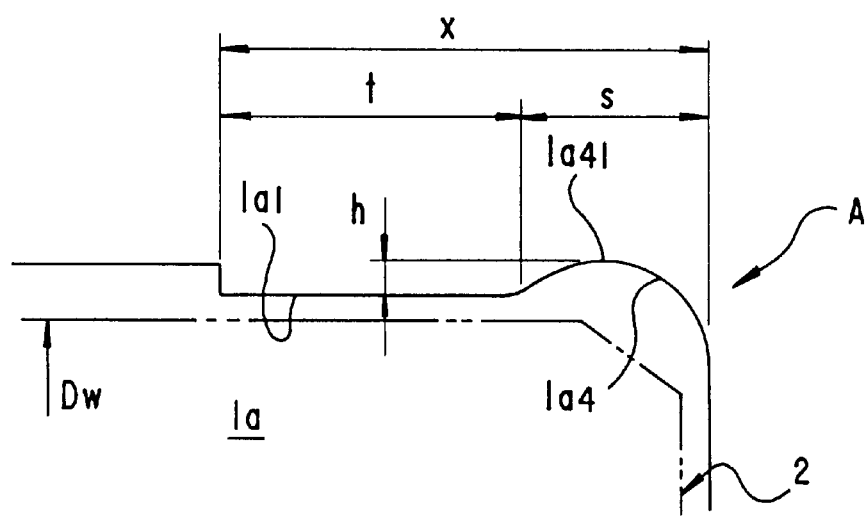
FIG. 3 is a partial enlarged plan view showing a corner of a pocket of a cage.

As shown enlarged in FIG. 3, the four corners A of each pocket 1a of the cage 1 are provided with relief portions 1a4 each having a circumferentially recessed arcuate peripheral wall surface. These relief portions 1a4 can be formed, when the pocket 1a is punched (press working) using a die and a punch, by providing the four corners of the punch with circumferentially protruding projections.

Preferably, the depth h of the relief portion 1a4, i.e., the circumferential dimension between the circumferential top 1a41 of the relief potion 1a4 and the pocket wall surface 1a1 is set with respect to the diameter Dw of the needle rollers 2 such that $0.01 \leq h/Dw \leq 0.2$ preferably $0.05 < h/Dw \leq 0.2$. If h/Dw is less than 0.01, then the effects the invention is intended to attain cannot be obtained, and, conversely, if h/Dw is greater than 0.2, this could lead to a lowing of the strength of the cage 1. Further, preferably, the axial dimension S of the relief portion 1a4 is set with respect to the axial dimension X from the center-associated end of the pocket wall surface 1a1 to the axial end of the pocket 1a such that $S \leq 0.6 X$. If S is greater than 0.6 X, then the axial dimension t of the pocket wall surface 1a1 which provides the roller slip-off preventing stop could be so small that the control force to prevent the needle roller 2 from slipping off radially outward could be insufficient.

The provision of the relief portions 1a4 at the corners A of each pocket 1a of the cage 1 permits the relief portions 1a4 to serve as passageways for the lubricating oil, ensuring smooth circulation of the lubricating oil between the inner and outer diameter sides of the cage 1. Therefore, foreign matter, such as abrasion powder from gears and the like, mixed in the lubricating oil find it more difficult to accumulate in the bearing and at the same time the feeding of lubricating oil to the surface of the bearing becomes smoother.

Further, as described above, in the prior cage, the corner round in a corner of the pocket has been set at a value smaller than the chamfer of a needle roller in order to avoid interference with the needle roller. However, since the relief portion 1a4 is of circumferentially recessed shape, a large radius of curvature as compared with the conventional corner round can be employed (for example, it can be set at a value which is 1.5 times or more as large as the chamfering dimension of the general chamfer 2a of the needle roller 2). This makes it possible to relax stress concentration in the corners A and increase the strength of the case 1.

Figure 4:
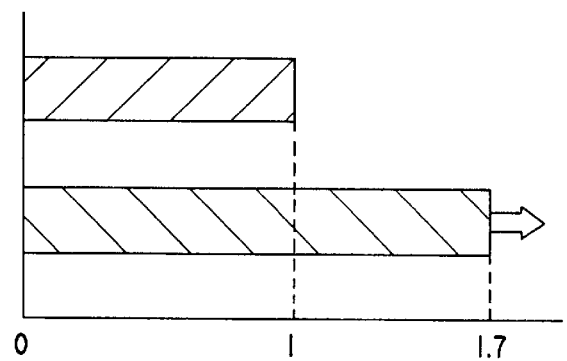
FIG. 4 is a graph showing the results of a durability test.

Durability tests were conducted using the needle roller bearing B (inventive article) according to said embodiment and a conventional needle roller bearing (conventional article) having no relief portions formed in the cage. The results are shown in FIG. 4. The tests were conducted by operating the test bearings under the conditions: a radial load of 513.9 N, the rpm being 17,000. And the end of the life was taken as the time when damage, such as flaking or peeling, occurred in the contact surface, and the life was measured by counting the total number of revolutions recorded in a period from the start of operation to the end of the life. As shown in the same figure, with the life (the total number of revolutions) of the conventional article taken as unity, the inventive article showed no occurrence of damage in the contact surface even at the point of time when the total number of revolutions was 1.7 (at which time the test was cut off), thus exhibiting superior durability.

Figure 5:
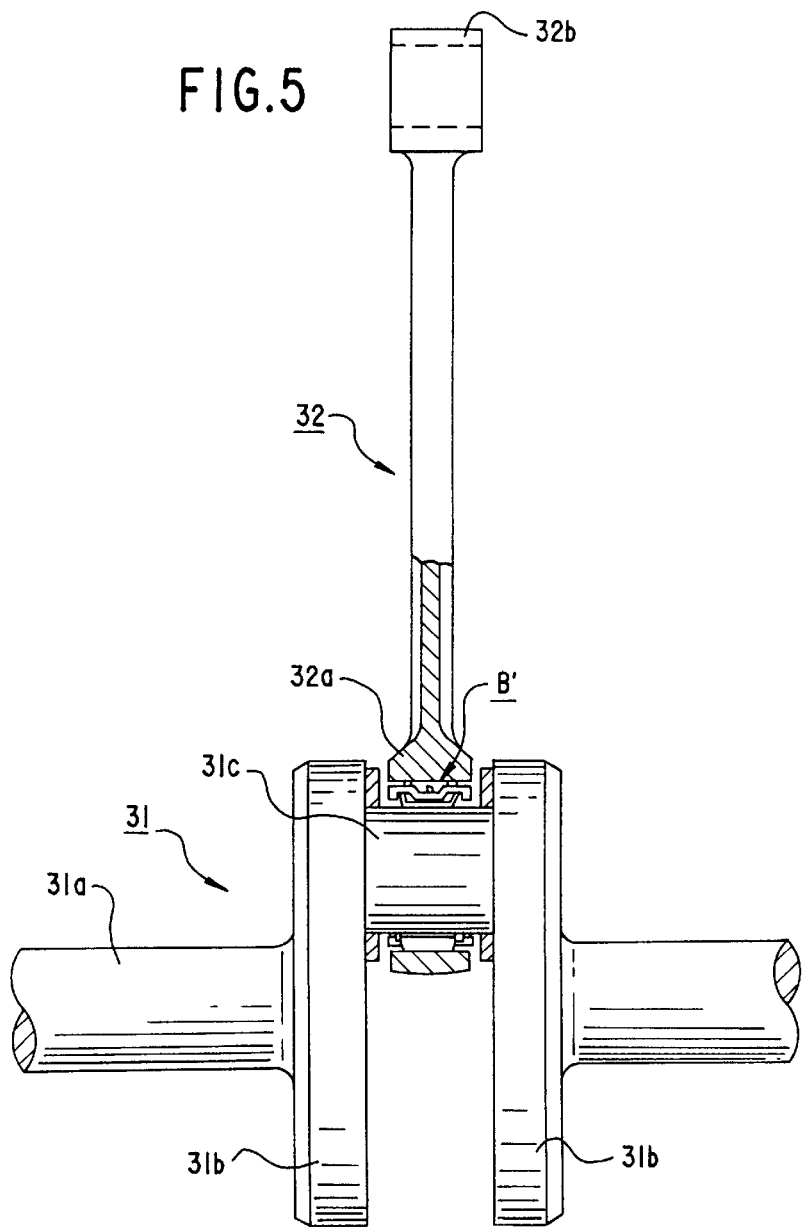
FIG. 5 is partial sectional view showing the region around the connecting rod of an engine.

FIG. 5 shows the crank shaft 31 and the connecting rod 32 of an engine (2-cycle engine, such as in a motorcycle).

The crank shaft 31 is disposed in an unillustrated crank chamber, and comprises a rotation center shaft 31a, a balance weight 31b, and a crank pin 31c. The crank pin 31c is constructed sometimes integral with and at other times separate from the balance weight 31b. The connecting rod 32 has a large diameter boss 32a at one end and a small diameter boss 32b at the other end, the large diameter boss 32a being fitted on the crank pin 31c through a needle roller bearing B'. In addition, the small diameter boss 32b of the connecting rod 32 is fitted on the piston pin of an unillustrated piston through a bearing.

A mixed gas of gasoline and lubricating oil is fed into the crank chamber and led to the combustion chamber of the cylinder and combusted as the cylinder moves up and down. And the combustion power of the mixed gas in the cylinder chamber forces the piston to move up and down, and this up-and-down movement of the piston is converted into a rotary movement of the rotation center shaft 31a by the connecting rod 32 and crank pin 31c, whereby the engine is rotated. The needle roller bearing B' (and the bearing interposed between the inner peripheral surface of the small diameter boss 32b of the connecting rod 32 and the outer peripheral surface of the piston pin) have the role of smoothly guiding the up-and-down movement of the piston and the operation of the connecting rod 32 accompanied by the eccentric rotary movement of the crank pin 31c. These bearings are lubricated by the lubricating oil contained in the mixed gas of gasoline and lubricating oil fed into the crank chamber and cylinder chamber, and since they are subjected to high temperature, the lubricating conditions are very severe. Particularly, since the needle roller bearing B' which supports the large diameter boss 32a of the connecting rod 32 is structurally subjected to high centrifugal force and inertial force, oil film exhaustion tends to occur in the slide surface of the cage and the like.

In the above construction, the use of the needle roller bearing B in the embodied form described above as the needle roller bearing B' interposed between the inner peripheral surface of the large diameter boss 32a of the connecting rod 32 and the outer peripheral surface of the crank pin 31c makes it possible to solve the problem about lubrication described above and prolong the life of the bearing. As for the cage 1, besides the cage of pressed steel sheet described above, there may be used a cage (machined cage) which is produced by lathing a steel pipe blank to form substantially M-shaped basic parts and then punching (pressing) them to form pockets. In addition, the needle roller bearing of the present invention may be used as a bearing for supporting the small diameter boss 32b of the connecting rod 32.

Figure 6:
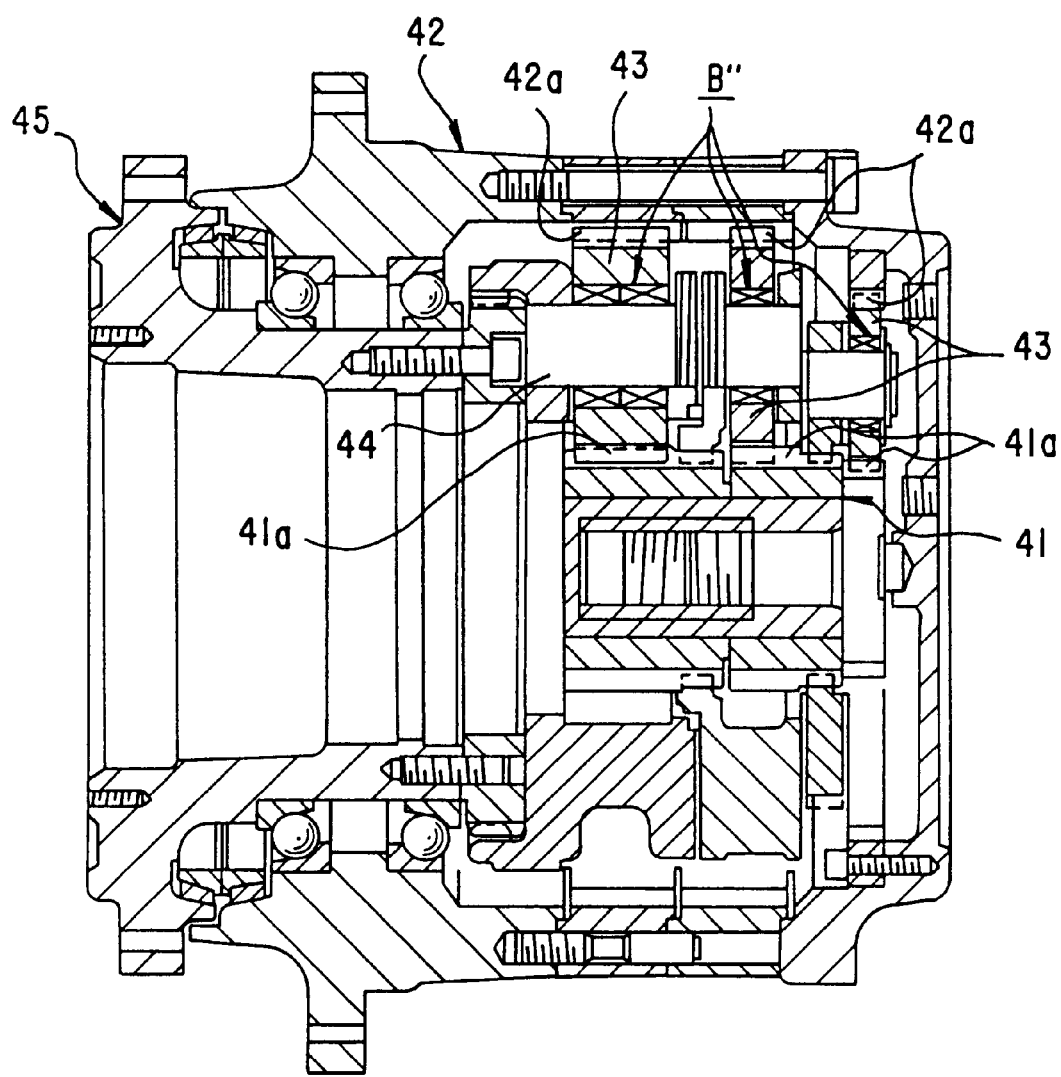
FIG. 6 is a sectional view showing a sun-and-planet gear device.
Figure 7A:
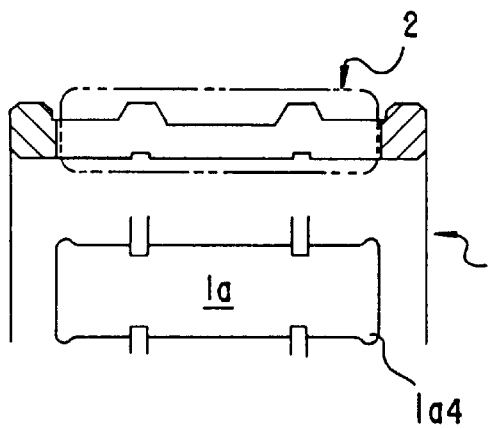
FIG. 7 is a sectional view showing variations of the shape and construction of a cage.
Figure 7B:
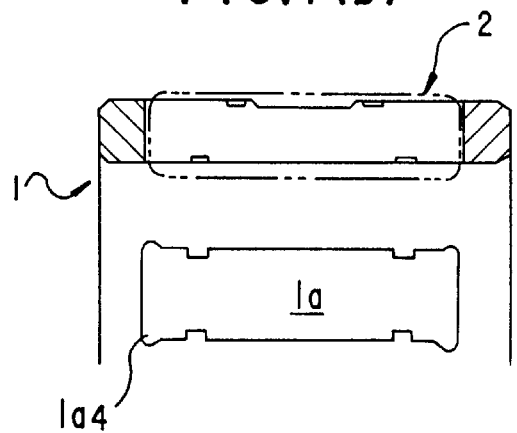
Figure 7C:
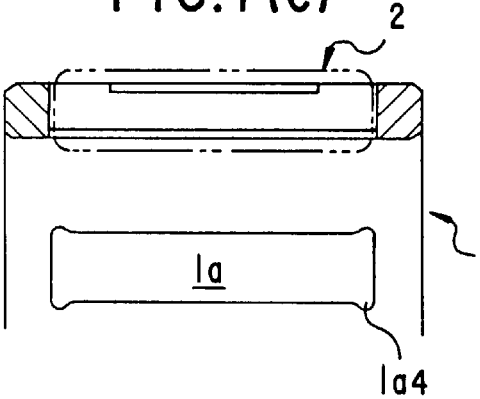
Figure 7D:
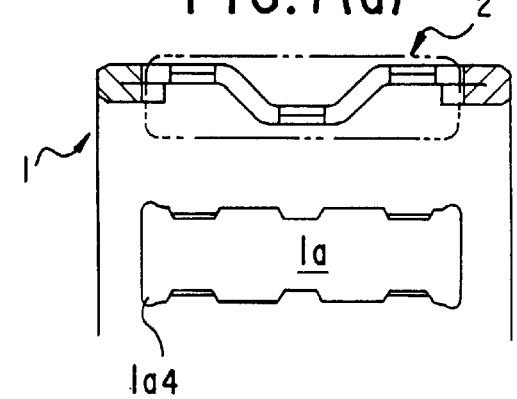
Figure 7E:
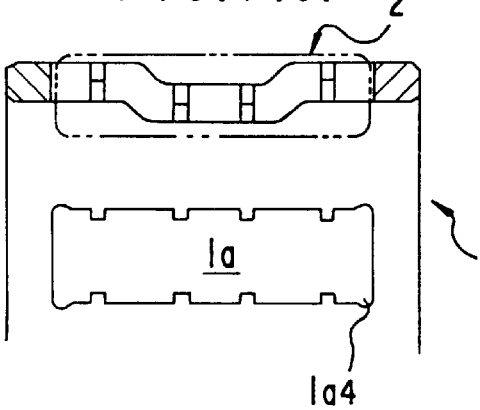
Figure 7F:
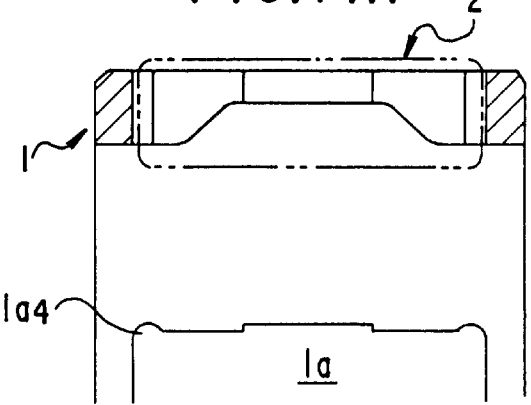
Figure 8A:
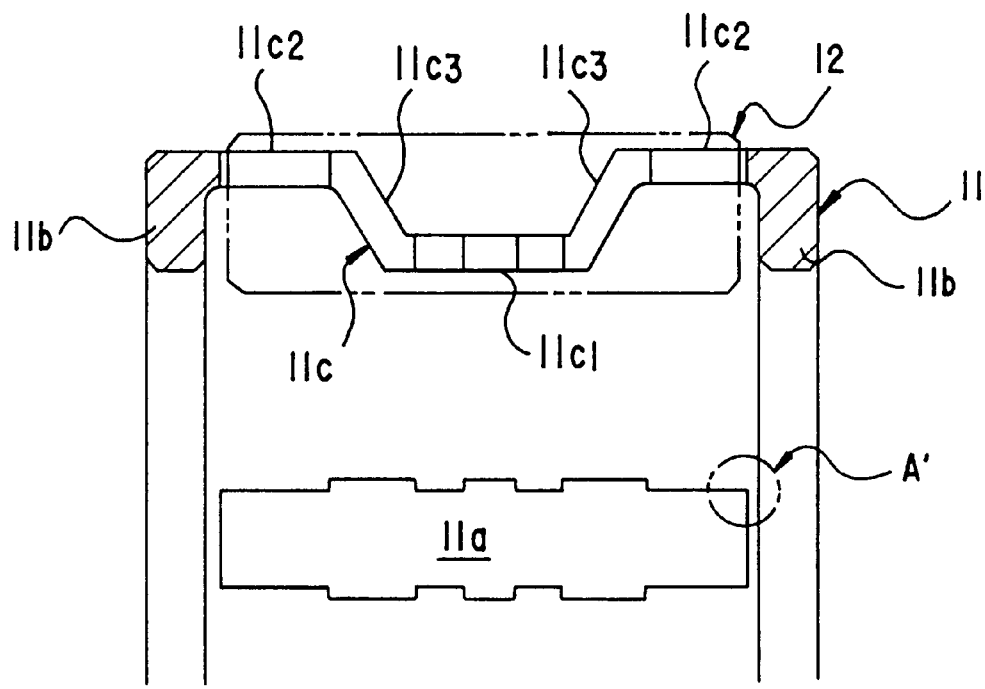
FIG. 8 is a sectional view (figure a) showing a conventional needle roller bearing and an enlarged plan view (figure b) showing a corner of a pocket of a cage.
Figure 8B:
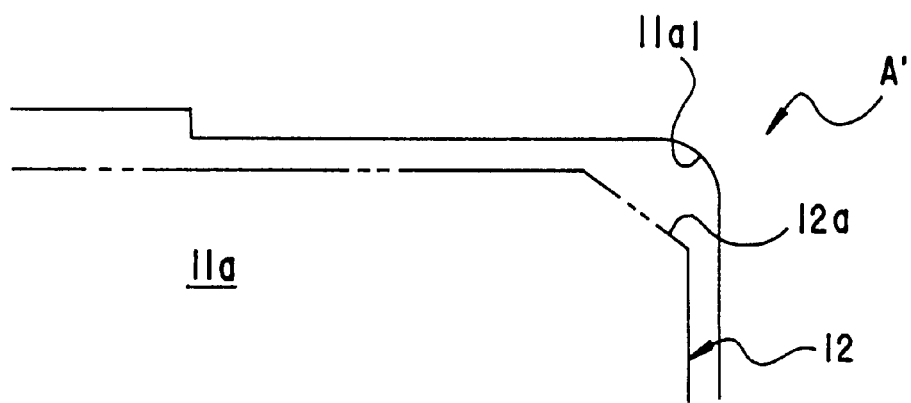

FIG. 6 shows a sun-and-planet gear device (sun-and-planet gear speed-reducer).

A plurality of planet gears 43 are interposed at circumferentially equal intervals between a sun gear 41a disposed on the outer periphery of an input member 41 and a fixed gear 42a disposed on the inner periphery of a casing 42 and mesh with both the sun gear 41a and the fixed gear 42a. Each planet gear 43 is rotatably supported by a support shaft 44 through a needle roller bearing B" and the support shafts 44 are fixed to an output member 45.

When the input member 41 (the sun gear 41a) is rotated, the planet gears 43 are rotated around the axes of their respective support shafts 44 while revolving around the axis of the input member 41. And the revolving movement of the planet gears 43 is converted into the rotary movement of the output member 45 through the support shafts 44, and the output member 45 is rotated at a speed reduced with a predetermined speed reduction ratio.

The needle roller bearings B" which support the planet gears 43 for rotation relative to the support shafts 44 are lubricated by lubricating oil in a casing 42; however, the lubricating oil in the casing 42 has abrasion powder from gears and the like mixed therein, readily causing the problem of the bearing life being decreased owing to the accumulation of foreign matter or the hindrance to circulation of lubricating oil.

In the above construction, the use of the needle roller bearing B in the embodied form described above as the needle roller bearing B" interposed between the inner peripheral surface of the planet gear 43 and the outer peripheral surface of the support shaft 44 makes it possible to solve the problem about lubrication described above and prolong the life of the bearing.

In addition, in the present invention, the material, method of production, shape, construction, etc., of the cage described above are not limited to what have been given above by way of example. For example, as to the cage, besides the press-formed cage and machined cage, it is possible to use a welded cage. Such welded cage is produced by press-forming a steel sheet blank to provide a flat sheet-like blank having a required basic cross-sectional shape, punching the flat sheet-like blank to form pockets, and welding the opposite ends of the flat sheet-like blank to form an annulus. Further, as to the case, besides the substantially M-shaped cage, it is possible to employ cages of various shapes and constructions shown in FIG. 7.

As described so far, according to the invention, since the corners of the pocket of the cage are provided with circumferentially recessed relief portions serving as passageways for lubricating oil, it is possible to enhance the discharge of accumulated foreign matter and the circulation of lubricating oil and thereby improve the bearing life.

The needle roller bearing of the invention has its life increasing effect exhibited remarkably when it is used as a support bearing for a rotary member in a transmission, a support bearing for the connecting rod in an engine, or a support bearing for a planet gear in a sun-and-planet gear device.

What is claimed is:

1. A needle roller bearing comprising:
   a cage having a plurality of elongated window-shaped pockets at predetermined circumferential intervals, annular portions on axially opposite sides of the pockets, and pillar portions on circumferentially opposite sides of the pockets, wherein an axially middle portion of each of the pillar portions is dented so as to be smaller in diameter than axially opposite portions thereof, the axially middle portion and the axially opposite portions being continuous to each other through inclined portions, the axially opposite portions being formed with pocket wall surfaces on the side of the pocket;
   a plurality of needle rollers received in the pockets of the cage, each of the needle rollers being prevented from radially outwardly slipping off from the pocket by the pocket wall surfaces,
   wherein the corners of each of the pockets are formed with circumferentially recessed relief portions serving as passageways for the lubricating oil, and wherein the circumferencial depth h of each of the relief portions with respect to the diameter Dw of the needle roller is defined by $0.01 \leq h/Dw \leq 0.2$, and the axial dimension S of each of the relief portions with respect to the axial dimension X from a center-associated end of the pocket wall surface to the axial end of the pocket is defined by $S \leq 0.6 X$.

2. A needle roller bearing as set forth in claim 1, wherein said needle roller bearing is used as a support for a rotary member in a transmission.

3. A needle roller bearing as set forth in claim 2, wherein said rotary member is a driven speed change gear.

4. A needle roller bearing as set forth in claim 1, wherein said needle roller bearing is used as a support for the connecting rod in an engine.

5. A needle roller bearing as set forth in claim 1, wherein said needle roller bearing is used as a support for a planet gear in a sun-and-planet gear device.

6. A cage for a needle roller bearing comprising:

a plurality of elongated window-shaped pockets at predetermined circumferential intervals;

annular portions on axially opposite sides of the pockets; and pillar portions on circumferentially opposite sides of the pockets, an axially middle portion of each of the pillar portions being dented so as to be smaller in diameter than axially opposite portions thereof, the axially middle portion and the axially opposite portions being continuous to each other through inclined portions, the axially opposite portions being formed with pocket wall surfaces on the side of the pocket for preventing a needle roller received in the pocket from radially outwardly slipping off from the pocket, wherein the corners of each of the pockets formed with circumferentially recessed relief portions serving as passageways for the lubricating oil, and wherein the circumferential depth h of each of the relief portions with respect to the diameter Dw of the needle roller is defined by $0.01 \leq h/Dw \leq 0.2$, and the axial dimension S of each of the relief portions with respect to the axial dimension X from a center-associated end of the pocket wall surface to the axial end of the rocket is defined by $S \leq 0.6 X$.

* * * * *